(12) United States Patent
Hu et al.

(10) Patent No.: US 10,789,598 B2
(45) Date of Patent: Sep. 29, 2020

(54) BLOCKCHAIN TRANSACTION RECONCILIATION METHOD AND APPARATUS, AND ELECTRONIC DEVICE

(71) Applicant: Alibaba Group Holding Limited, George Town (KY)

(72) Inventors: Danqing Hu, Hangzhou (CN); Sen Lin, Shanghai (CN); Junliang Zhang, Hangzhou (CN)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 16/424,750

(22) Filed: May 29, 2019

(65) Prior Publication Data
US 2019/0370810 A1 Dec. 5, 2019

(30) Foreign Application Priority Data
May 29, 2018 (CN) .......................... 2018 1 0533812

(51) Int. Cl.
G06Q 40/00 (2012.01)
G06Q 20/40 (2012.01)
(Continued)

(52) U.S. Cl.
CPC ......... G06Q 20/407 (2013.01); G06F 16/903 (2019.01); G06Q 20/389 (2013.01);
(Continued)

(58) Field of Classification Search
CPC ... G06Q 20/065; G06Q 20/363; G06Q 20/382
See application file for complete search history.

(56) References Cited

U.S. PATENT DOCUMENTS

| 8,700,476 B1 | 4/2014 | Pienkos |
| 10,169,757 B1 | 1/2019 | Vippagunta et al. |

(Continued)

FOREIGN PATENT DOCUMENTS

| CN | 105809420 | 7/2016 |
| CN | 106327332 | 1/2017 |

(Continued)

OTHER PUBLICATIONS

Lewis, Anthony (Thoughts on blockchain technology, https://web.archive.org/web/20160328070356/https://bitsonblocks.net/2016/02/29/a-gentle-introduction-to-immutability-of-blockchains/, Mar. 28, 2016) (Year: 2016).*

(Continued)

*Primary Examiner* — Sarah H Monfeldt
*Assistant Examiner* — Mark H Gaw
(74) *Attorney, Agent, or Firm* — Fish & Richardson P.C.

(57) ABSTRACT

A blockchain transaction record that is selected from a blockchain account book associated with a blockchain and satisfies a specified condition is obtained by a blockchain member. The blockchain transaction record is compared with an off-chain transaction record maintained by the blockchain member to obtain a comparison value indicating whether the off-chain transaction record is consistent with the blockchain transaction record. If the comparison value indicates that the off-chain transaction record is inconsistent with the blockchain transaction record, the off-chain transaction record is modified based on the blockchain transaction record to make the off-chain transaction record consistent with the blockchain transaction record.

15 Claims, 8 Drawing Sheets

(51) Int. Cl.
  *G06F 16/903* (2019.01)
  *G06Q 20/38* (2012.01)
  *H04L 9/06* (2006.01)

(52) U.S. Cl.
  CPC ........ *H04L 9/0637* (2013.01); *H04L 2209/38* (2013.01); *H04L 2209/56* (2013.01)

(56) References Cited

U.S. PATENT DOCUMENTS

| | | | |
|---|---|---|---|
| 2009/0024527 A1 | 1/2009 | Sellen | |
| 2014/0114852 A1 | 4/2014 | Rajagopal et al. | |
| 2014/0364552 A1 | 12/2014 | Katakami | |
| 2015/0170112 A1 | 6/2015 | DeCastro | |
| 2015/0262137 A1* | 9/2015 | Armstrong | G06Q 20/36 705/41 |
| 2015/0271183 A1 | 9/2015 | MacGregor et al. | |
| 2015/0332283 A1 | 11/2015 | Witchey | |
| 2015/0365283 A1 | 12/2015 | Ronca et al. | |
| 2016/0092988 A1 | 3/2016 | Letourneau | |
| 2016/0203477 A1 | 7/2016 | Yang | |
| 2016/0260169 A1 | 9/2016 | Arnold et al. | |
| 2016/0275461 A1* | 9/2016 | Sprague | H04W 12/06 |
| 2016/0330034 A1 | 11/2016 | Back et al. | |
| 2017/0005804 A1 | 1/2017 | Zinder | |
| 2017/0046651 A1 | 2/2017 | Lin et al. | |
| 2017/0046664 A1 | 2/2017 | Haldenby et al. | |
| 2017/0048235 A1 | 2/2017 | Lohe et al. | |
| 2017/0109735 A1 | 4/2017 | Sheng et al. | |
| 2017/0132626 A1 | 5/2017 | Kennedy | |
| 2017/0140371 A1 | 5/2017 | Forzley et al. | |
| 2017/0154331 A1 | 6/2017 | Voorhees | |
| 2017/0236102 A1 | 8/2017 | Biton | |
| 2017/0236104 A1 | 8/2017 | Biton | |
| 2017/0237554 A1 | 8/2017 | Jacobs et al. | |
| 2017/0243193 A1 | 8/2017 | Manian et al. | |
| 2017/0344988 A1* | 11/2017 | Cusden | G06F 21/00 |
| 2017/0331896 A1 | 12/2017 | Holloway et al. | |
| 2017/0364552 A1 | 12/2017 | Pattanaik et al. | |
| 2017/0366357 A1* | 12/2017 | Pattanaik | G06Q 20/3829 |
| 2017/0367023 A1 | 12/2017 | Demchenko | |
| 2018/0005235 A1 | 1/2018 | Thorne | |
| 2018/0012311 A1 | 1/2018 | Small et al. | |
| 2018/0039667 A1 | 2/2018 | Pierce et al. | |
| 2018/0046992 A1 | 2/2018 | Hanrahan et al. | |
| 2018/0053162 A1 | 2/2018 | Janes | |
| 2018/0096349 A1 | 4/2018 | McDonald et al. | |
| 2018/0101844 A1 | 4/2018 | Song et al. | |
| 2018/0101848 A1 | 4/2018 | Castagna et al. | |
| 2018/0144156 A1 | 5/2018 | Marin | |
| 2018/0191503 A1 | 7/2018 | Alwar et al. | |
| 2018/0240112 A1 | 8/2018 | Castinado et al. | |
| 2018/0365670 A1 | 12/2018 | Dunjic et al. | |
| 2019/0026821 A1 | 1/2019 | Bathen et al. | |
| 2019/0052454 A1 | 2/2019 | Wright et al. | |
| 2019/0066206 A1 | 2/2019 | Marks | |
| 2019/0108582 A1 | 4/2019 | Sebastian et al. | |
| 2019/0130399 A1 | 5/2019 | Wright et al. | |
| 2019/0165930 A1 | 5/2019 | Castinado et al. | |
| 2019/0370798 A1 | 12/2019 | Hu et al. | |
| 2019/0370807 A1 | 12/2019 | Hu et al. | |
| 2019/0370809 A1 | 12/2019 | Hu et al. | |
| 2019/0370811 A1 | 12/2019 | Zhang et al. | |

FOREIGN PATENT DOCUMENTS

| | | |
|---|---|---|
| CN | 106504085 | 3/2017 |
| CN | 106960388 | 7/2017 |
| CN | 107016542 | 8/2017 |
| CN | 107038578 | 8/2017 |
| CN | 107133796 | 9/2017 |
| CN | 107341702 | 11/2017 |
| CN | 107358420 | 11/2017 |
| CN | 107358422 | 11/2017 |
| CN | 107358524 | 11/2017 |
| CN | 107392584 | 11/2017 |
| CN | 107729398 | 2/2018 |
| CN | 107742210 | 2/2018 |
| CN | 108009811 | 5/2018 |
| CN | 108055138 | 5/2018 |
| CN | 108074177 | 5/2018 |
| RU | 2016122196 | 12/2017 |
| RU | 2649788 | 4/2018 |
| RU | 2673842 | 11/2018 |
| TW | 200834456 | 8/2008 |
| TW | 201732697 | 9/2017 |
| TW | 201800997 | 1/2018 |
| TW | 201810150 | 3/2018 |
| TW | 201816679 | 5/2018 |
| WO | WO 2009012452 | 1/2009 |
| WO | WO 2017070469 | 4/2017 |
| WO | WO 2017145047 | 8/2017 |
| WO | WO 2017178956 | 10/2017 |
| WO | WO 2018204548 | 11/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/US2019/034251, dated Aug. 2, 2019, 7 pages.

PCT International Search Report and Written Opinion in International Application No. PCT/US2019/034253, dated Jul. 25, 2019, 5 pages.

PCT International Search Report and Written Opinion in International Application No. PCT/US2019/034257, dated Aug. 15, 2019, 6 pages.

PCT International Search Report and Written Opinion in International Application No. PCT/US2019/034260, dated Aug. 15, 2019, 6 pages.

PCT International Search Report and Written Opinion in International Application No. PCT/US2019/034266, dated Aug. 16, 2019, 6 pages.

Extended European Search Report in European Application No. 19727275.0, dated Mar. 20, 2020, 8 pages.

Extended European Search Report in European Application No. 19727818.7, dated Apr. 16, 2020, 9 pages.

Extended European Search Report in European Application No. 19726878.2, dated Mar. 4, 2020, 7 pages.

Extended European Search Report issued in European Application No. 19727819.5 dated Feb. 12, 2020, 10 pages.

Stellar.com [Online], "Stellar—Developers," Apr. 15, 2017, [retrieved on Jan. 14, 2020], retrieved from URL<https://web.archive.org/web/2017G415145348/https://www.stellar.org/developers/guides/get-started/index.html>, 118 pages.

\* cited by examiner

BLOCKCHAIN TRANSACTION RECONCILIATION METHOD AND APPARATUS, AND ELECTRONIC DEVICE

CROSS-REFERENCE TO RELATED APPLICATIONS

This application claims priority to Chinese Patent Application No. 201810533812.0, filed on May 29, 2018, which is hereby incorporated by reference in its entirety.

TECHNICAL FIELD

One or more implementations of the present specification relate to the field of terminal technologies, and in particular, to a blockchain transaction reconciliation method and apparatus, and an electronic device.

BACKGROUND

In related technologies, various solutions for implementing blockchain transactions such as asset creation and asset transfer through blockchain networks are proposed. When transaction operations are implemented based on the blockchain network, the transaction operations can be automatically implemented through a smart contract, and transaction records can be recorded in the blockchain account book without being tampered with, thereby eliminating mistrust between blockchain members and also solving the problem of interconnection between off-chain management systems of different blockchain members.

SUMMARY

In view of this, one or more implementations of the present specification provide a blockchain transaction reconciliation method and apparatus, and an electronic device.

To achieve the previous objective, one or more implementations of the present specification provide the following technical solutions:

According to a first aspect of one or more implementations of the present specification, a blockchain transaction reconciliation method is proposed, including: obtaining, by a blockchain member, a blockchain transaction record that is selected from a blockchain and satisfies a specified condition; comparing, by the blockchain member, the blockchain transaction record with an off-chain transaction record maintained by the blockchain member; and changing, by the blockchain member, the off-chain transaction record based on the blockchain transaction record when the off-chain transaction record is inconsistent with the blockchain transaction record.

According to a second aspect of one or more implementations of the present specification, a blockchain transaction reconciliation apparatus is proposed, including: a selection unit, configured to enable a blockchain member to obtain a blockchain transaction record that is selected from a blockchain and satisfies a specified condition; a comparison unit, configured to enable the blockchain member to compare the blockchain transaction record with an off-chain transaction record maintained by the blockchain member; and a changing unit, configured to enable the blockchain member to change the off-chain transaction record based on the blockchain transaction record when the off-chain transaction record is inconsistent with the blockchain transaction record.

According to a third aspect of one or more implementations of the present specification, an electronic device is proposed, including: a processor; and a memory, configured to store an instruction that can be executed by the processor; wherein the processor is configured to implement the method according to any one of the previous implementations.

DESCRIPTION OF IMPLEMENTATIONS

Example implementations are described in detail here, and examples of the example implementations are presented in the accompanying drawings. When the following description relates to the accompanying drawings, unless specified otherwise, the same numbers in different accompanying drawings represent same or similar elements. Implementations described in the following example implementations do not represent all implementations consistent with one or more implementations of the present specification. On the contrary, the implementations are only examples of apparatuses and methods that are described in the appended claims in detail and consistent with some aspects of the one or more implementations of the present specification.

It is worthwhile to note that in other implementations, steps of the corresponding method are not necessarily performed in the order shown and described in the present specification. In some other implementations, the method can include more or fewer steps than those described in the present specification. In addition, a single step described in the present specification can be divided into a plurality of steps for description in another implementation, and a plurality of steps described in the present specification can be combined into a single step for description in another implementation.

Figure 1:
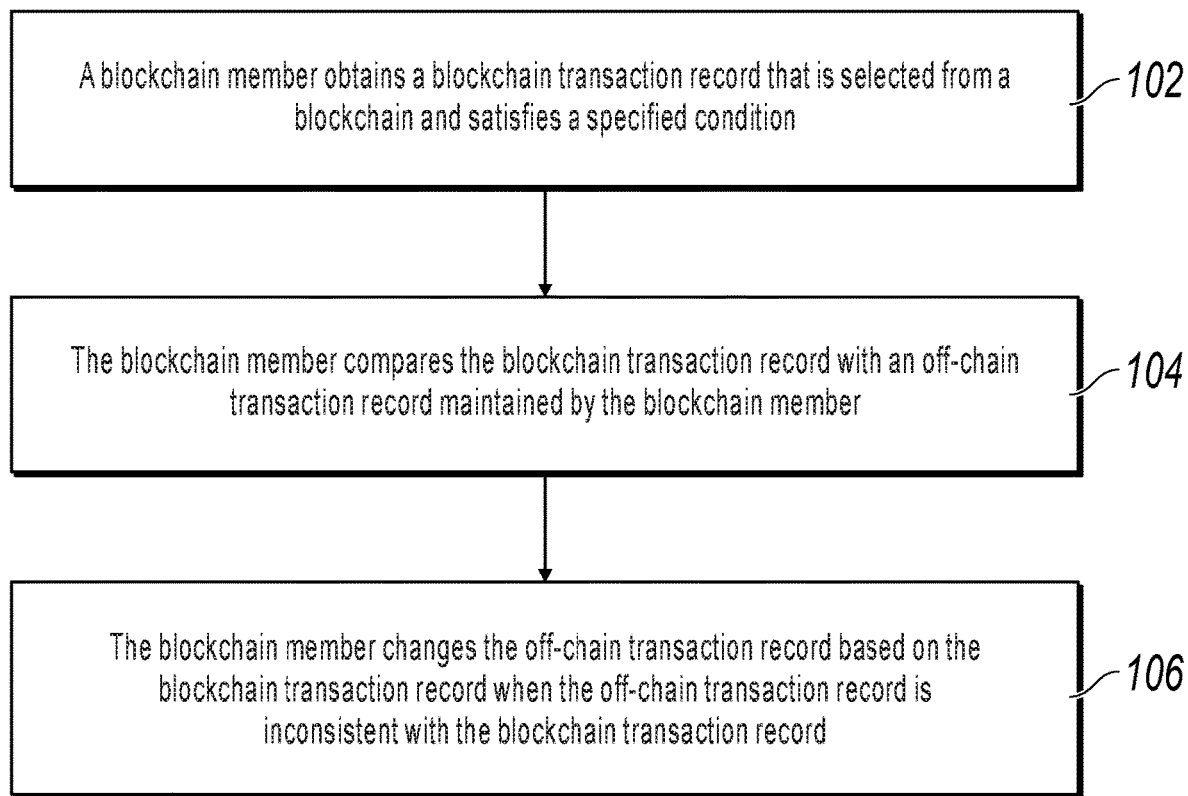
FIG. 1 is a flowchart illustrating a blockchain transaction reconciliation method, according to an example implementation.

FIG. 1 is a flowchart illustrating a blockchain transaction reconciliation method, according to an example implementation. As shown in FIG. 1, the method can include the following steps.

Step 102: A blockchain member obtains a blockchain transaction record that is selected from a blockchain and satisfies a specified condition.

In an implementation, the blockchain can include several blockchain nodes, and these blockchain nodes can include a blockchain member (or referred to as a member for short) and an anchor point. The blockchain member can assume the role of the anchor point, or the anchor point can be independent of the blockchain member. To be specific, the role of the anchor point is unnecessarily assumed by the blockchain member.

In an implementation, the blockchain member can be a financial institution, an organization or a platform in another form that supports an asset transfer service. Implementations are not limited in the present specification.

In an implementation, the anchor point is used to anchor point blockchain assets on the blockchain to off-chain assets outside the blockchain, so that the off-chain asset can be exchanged for an equivalent blockchain asset through the anchor point, and the blockchain asset can also be exchanged for an equivalent off-chain asset through the anchor point, thereby implementing one-to-one mapping between the blockchain assets and off-chain assets. For example, the blockchain member can deposit the off-chain asset at the anchor point, and obtain and hold a blockchain asset issued by the corresponding anchor point on the blockchain. In addition, blockchain members can transfer held blockchain assets to each other, and holdings of the blockchain members in blockchain assets issued by anchor points and changes of the blockchain assets can be registered in a blockchain account book of the blockchain, to manage the blockchain assets together.

In an implementation, the "assets" in the present specification can be in any type, such as cash, securities, and stocks; or devices, vehicles, estates, and goods. Implementations are not limited in the present specification.

In an implementation, asset transfer operations occurring on the blockchain form corresponding blockchain transaction records in the blockchain account book. These blockchain transaction records can record information related to asset transfer, such as information about an asset transferor, information about an asset transferee, an asset type, a transaction amount, and a transaction time. Implementations are not limited in the present specification.

In an implementation, the blockchain member can connect the inside and the outside of the blockchain network through a bridge module, enabling the blockchain member to transmit a condition that is configured by a user to the inside of the blockchain network to form the specified condition for selecting a blockchain transaction record included in the blockchain account book.

In an implementation, because all blockchain nodes maintain a unified blockchain account book together, each blockchain member can obtain all contents recorded in the blockchain account book, to actively select a corresponding blockchain transaction record based on the specified condition, to obtain a blockchain transaction record satisfying the specified condition.

In an implementation, the blockchain can include a reconciliation service provider. The reconciliation service provider can include one or more specific blockchain nodes on the blockchain, and can be used to provide a transaction record query service for the blockchain member. For example, the blockchain member can send the specified condition to the reconciliation service provider by using the bridge module, so that the reconciliation service provider can select a blockchain transaction record based on the specified condition. Then the blockchain member receives the blockchain transaction record returned by the reconciliation service provider. Therefore, the blockchain member does not need to actively perform the selection operation. The reconciliation service provider can provide related services for all the blockchain members on the blockchain, and all the blockchain members can enjoy the services provided by the reconciliation service provider without separately performing the selection operation on the blockchain transaction record, so that the blockchain members can focus more on blockchain-based asset transactions.

In an implementation, the specified condition can include at least one of the following: a time period including a creation moment of the blockchain transaction record, a blockchain member participating in a blockchain transaction corresponding to the blockchain transaction record, and a condition that the blockchain transaction record is a normal transaction record or a refund transaction record.

Step 104: The blockchain member compares the blockchain transaction record with an off-chain transaction record maintained by the blockchain member.

In an implementation, the blockchain member can export the blockchain transaction record by using a bridge module configured between the blockchain member and the blockchain, to compare the blockchain transaction record with the off-chain transaction record off the chain. The bridge module is separately connected to a first data interface provided by the blockchain member and a second data interface provided by the blockchain. In another implementation, the blockchain member can export the blockchain transaction record in another method. Implementations are not limited in the present specification.

Step 106: The blockchain member changes the off-chain transaction record based on the blockchain transaction record when the off-chain transaction record is inconsistent with the blockchain transaction record.

In an implementation, the blockchain transaction record in the blockchain account book cannot be tampered with and can be traced, so that the blockchain transaction record registered in the blockchain account book is reliable enough and can be trusted by all the blockchain members. Therefore, the blockchain member can change the off-chain transaction record based on the blockchain transaction record, so that the off-chain transaction record is consistent with the blockchain transaction record.

In an implementation, the blockchain transaction record and the off-chain transaction record can both record information about several dimensions for the same blockchain transaction record. Although there may be a difference between the blockchain transaction record and the dimensions concerned by the off-chain transaction record, and such difference may result in a difference between the content of them, their contents are still consistent and comparable.

In an implementation, the blockchain member can enter the specified condition and change information for the off-chain transaction record into the blockchain, to record in the blockchain account book that the specified condition and the change information cannot be tampered with and can be traced. Therefore, not only regulatory query requirements of regulatory authorities can be satisfied, but also improper changes made by unauthorized personnel to the off-chain transaction record can be determined accordingly.

Figure 2:
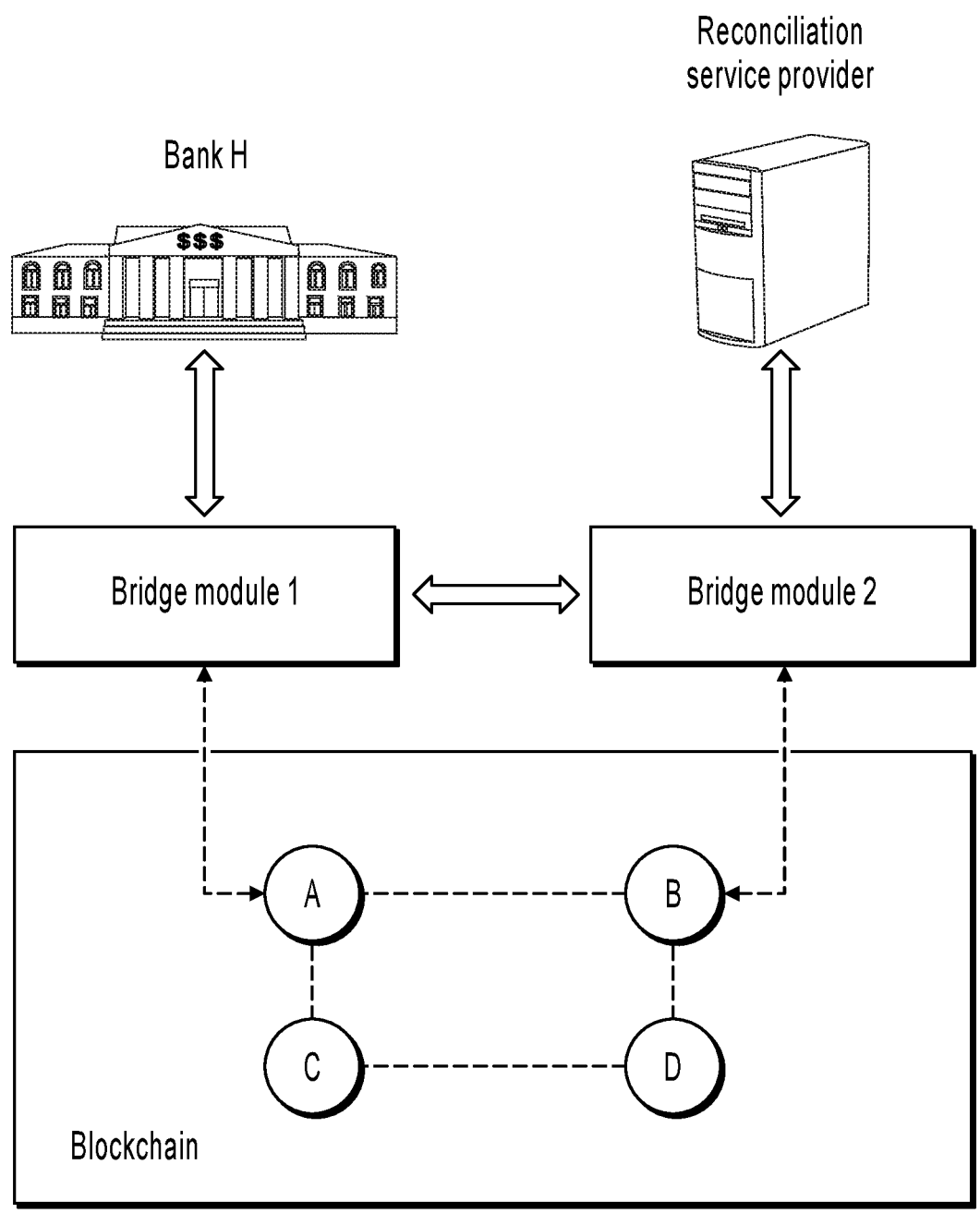
FIG. 2 is a schematic architectural diagram illustrating a blockchain network, according to an example implementation.

For ease of understanding, the technical solutions in one or more implementations of the present specification are described below by using an example that a bank performs reconciliation on blockchain transfer data. FIG. 2 is a schematic architectural diagram illustrating a blockchain network, according to an example implementation. As shown in FIG. 2, bank H is used as an example. Bank H serves as a financial institution outside a blockchain, and can conduct services with individuals, enterprises, and other financial institutions. In addition, bank H can maintain a corresponding blockchain node A inside the blockchain, so that bank H can serve as a blockchain member in the blockchain network based on blockchain node A. Bank H is connected to blockchain node A by using bridge module 1 shown in FIG. 2. Through the bridge node A, both on- and off-chain data exchanges between bank H and blockchain node A can be implemented. Similarly, a reconciliation service provider can maintain a corresponding blockchain node B in the blockchain network. For example, the service provider can exchange data with blockchain node B by using bridge module 2 shown in FIG. 2. Certainly, the blockchain network can further include other nodes such as blockchain node C and blockchain node D shown in FIG. 2. Details are omitted here.

Bank H can obtain a blockchain transaction record that bank H is interested by using a plurality of methods.

For example, in an implementation, a staff of bank H can configure a corresponding selection condition for a concerned transaction, and can obtain a blockchain account book maintained on blockchain node A by using bridge module 1. The blockchain account book is consistent with blockchain account books maintained on other blockchain nodes such as blockchain nodes B, C, and D, and each of the blockchain account books records full blockchain account book information, including blockchain transaction records corresponding to all transactions that occur in the blockchain network. Therefore, the staff of bank H can select a blockchain transaction record from the obtained blockchain account book based on the selection condition, to obtain a corresponding selection result. The selection result includes the blockchain transaction record that bank H is interested.

Figure 3:
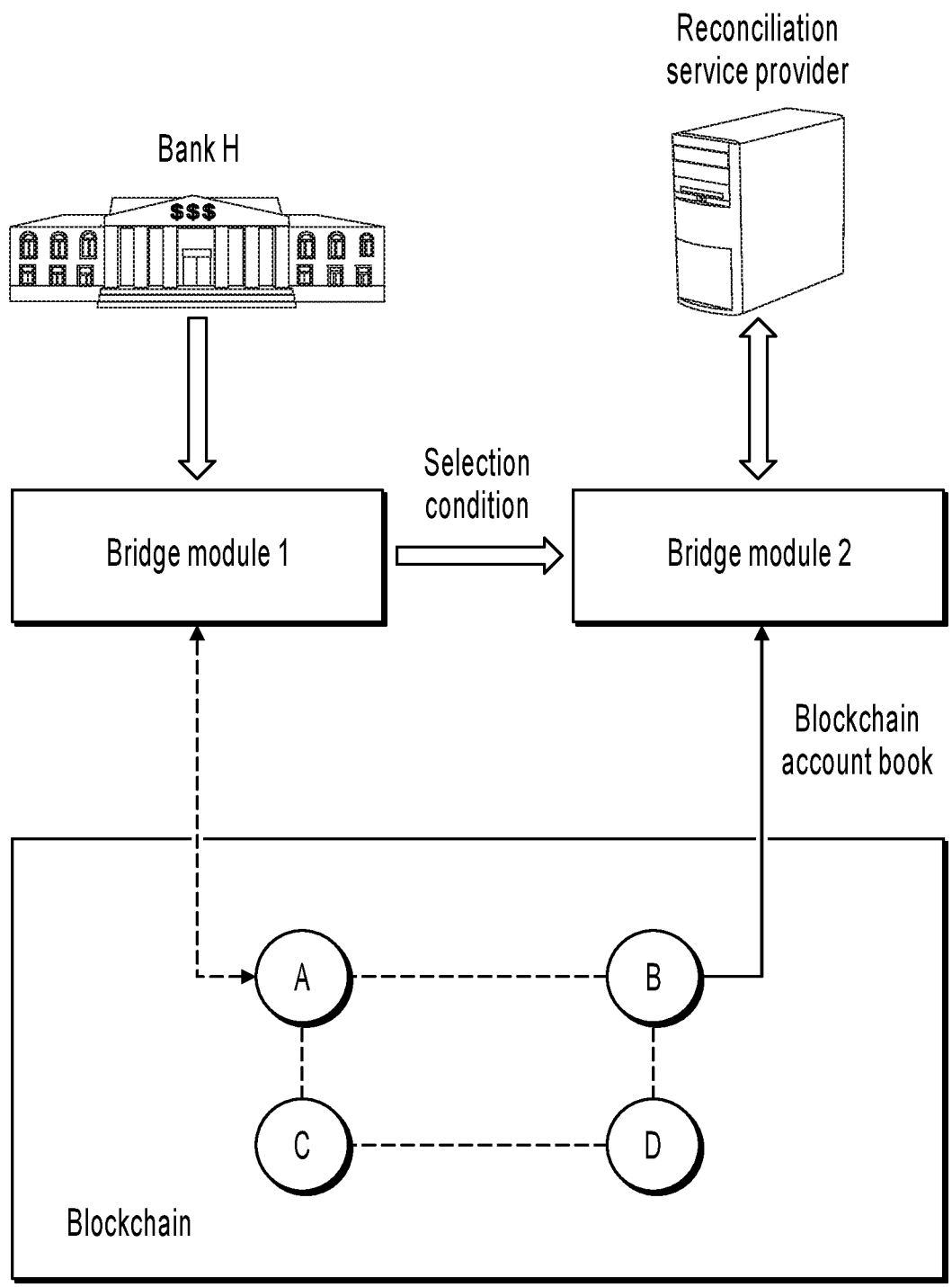
FIG. 3 is a schematic diagram illustrating setting a selection condition, according to an example implementation.

In an implementation, bank H can entrust the reconciliation service provider so that the reconciliation service provider provides bank H with a blockchain transaction record that bank H is interested. FIG. 3 is a schematic diagram illustrating setting a selection condition, according to an example implementation. As shown in FIG. 3, bank H and the reconciliation service provider can interact with each other by using bridge module 1 and bridge module 2, so that bank H can transmit the selection condition to the reconciliation service provider by using bridge module 1 and bridge module 2. In addition, the reconciliation service provider can obtain a blockchain account book maintained by blockchain node B by using bridge module 1 and bridge module 2. The blockchain account book records full blockchain account book information, including blockchain transaction records corresponding to all transactions that occur in the blockchain network. Therefore, the reconciliation service provider can select a blockchain transaction record from the obtained blockchain account book based on the selection condition set by bank H, to obtain a corresponding selection result. The selection result includes the blockchain transaction record that bank H is interested. Certainly, bank H can transmit the selection condition to blockchain node A by using bridge module 1, and blockchain node A writes the selection condition into the blockchain account book. The reconciliation service provider can read the blockchain account book from blockchain node B by using bridge module 2, to obtain the selection condition written by bank H.

In an implementation, bank H can establish a partnership with the reconciliation service provider off the chain, so that the reconciliation service provider can obtain the selection condition set by bank H and provide bank H with a blockchain transaction record satisfying the condition. In another implementation, bank H and the reconciliation service provider can establish a partnership in the blockchain network by using blockchain nodes A and B. For example, blockchain nodes A and B both join the same smart contract. The smart contract can require that when a blockchain member (namely, bank H) corresponding to blockchain node A provides a selection condition for a blockchain member (namely, the reconciliation service provider) corresponding to blockchain node B, the blockchain member corresponding to blockchain node B provides a corresponding selection result for the blockchain member corresponding to blockchain node A. The selection result includes a blockchain transaction record that satisfies the selection condition in the blockchain account book.

In an implementation, the selection condition can include conditions in one or more dimensions that bank H is interested, for example, include one or more of the following dimensions: a time period including a creation moment of the blockchain transaction record, a blockchain member participating in a blockchain transaction corresponding to the blockchain transaction record, and a condition that the blockchain transaction record is a normal transaction record or a refund transaction record. Implementations are not limited in the present specification.

In an implementation, the operation of setting the selection condition by bank H and the selection operation performed by the reconciliation service provider based on the selection condition can be performed asynchronously. For example, after bank H sets the selection condition for the first time, the selection condition can be subsequently used to perform each selection operation without setting the selection condition each time again. Certainly, a requirement of bank H possibly changes, and therefore bank H can update the selection condition. However, the reconciliation service provider only needs to determine a current latest selection condition based on a pre-agreed period (for example, every week, every month, and every quarter), and implement the selection operation based on the current latest selection condition.

In an implementation, bank H can actively initiate a selection request to the reconciliation service provider, and adds a current selection condition to the selection request. The reconciliation service provider can perform the selection operation based on the current selection condition. For example, when based on the smart contract method described above, bank H can trigger the smart contract by setting the selection condition, to initiate the selection request to the reconciliation service provider based on the smart contract.

In an implementation, the reconciliation service provider can actively initiate an inquiry to bank H based on a pre-agreed period and receive a selection condition returned by bank H, so that the reconciliation service provider can perform the selection operation based on the selection condition.

Figure 4:
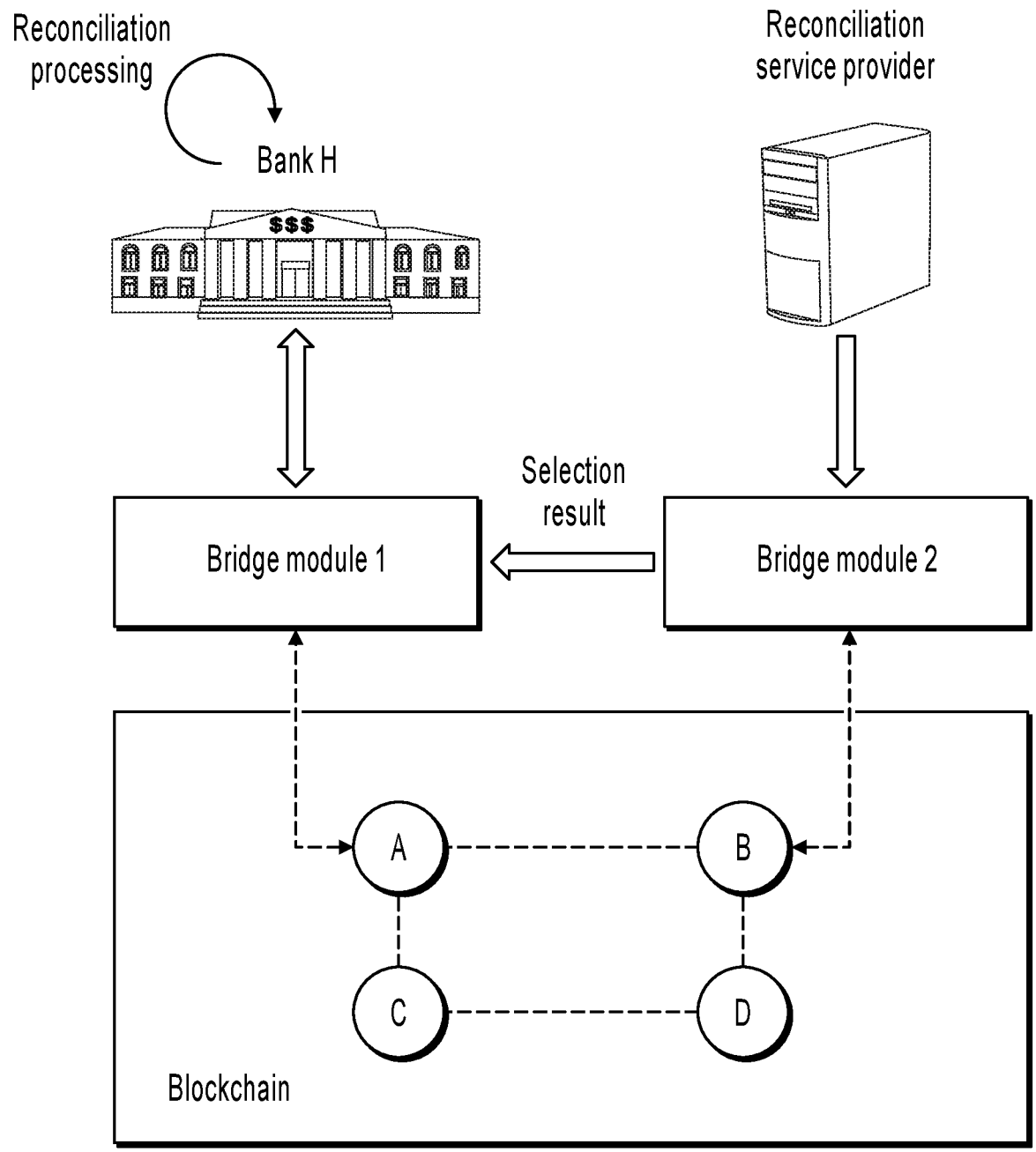
FIG. 4 is a schematic diagram illustrating reconciliation based on a selection result, according to an example implementation.

FIG. 4 is a schematic diagram illustrating reconciliation based on a selection result, according to an example implementation. As shown in FIG. 4, the reconciliation service provider selects, from the blockchain account book based on a selection condition provided by bank H, a blockchain transaction record satisfying the selection condition, to form a corresponding selection result. In addition, the reconciliation service provider can exchange data with bank H by using bridge module 2 and bridge module 1, to provide the selection result to bank H. Certainly, the reconciliation service provider can also transmit the selection result to blockchain node B by using bridge module 2, and blockchain node B writes the selection result into the blockchain account book. Bank H can read the blockchain account book from blockchain node A by using bridge module 1, to obtain the selection result written by the reconciliation service provider.

In an implementation, bank H records an off-chain transaction record, that is, a transaction maintained by bank H. Therefore, bank H can compare the off-chain transaction record with a blockchain transaction record, which is selected by bank H or provided by the reconciliation service provider, to implement reconciliation processing.

In an implementation, the blockchain transaction record can usually include information about all dimensions related to a transaction, and the off-chain transaction record usually includes only information about dimensions concerned by bank H. Certainly, in some cases, the blockchain transaction record can also only include information about partial dimensions. In conclusion, when the blockchain transaction record and the off-chain transaction record describe the same transaction, although the description dimensions used by them may be different, theoretically, contents recorded in the two transaction records are consistent with each other, and both records are objective descriptions of the same transaction.

However, various problems usually exist in the off-chain transaction record. For example, bank H possibly miss partial information in the off-chain transaction record due to various reasons, and consequently, transaction details cannot be presented completely. For another example, unauthorized personnel possibly tamper with the off-chain transaction record maintained by bank H to achieve an illegal purpose. For another example, a staff of bank H possibly inadvertently performs an erroneous operation on the off-chain transaction record, causing an error in the recorded content.

Based on a feature of the blockchain, the blockchain transaction record recorded in the blockchain account book cannot be tampered with and can be traced, thereby ensuring trueness and reliability of the content in the blockchain transaction record. Therefore, by comparing the blockchain transaction record with the off-chain transaction record, missing information or an error in the off-chain transaction record can be discovered based on the blockchain transaction record, so that bank H can supplement the missing information in the off-chain transaction record and correct the error based on the blockchain transaction record.

Figure 5:
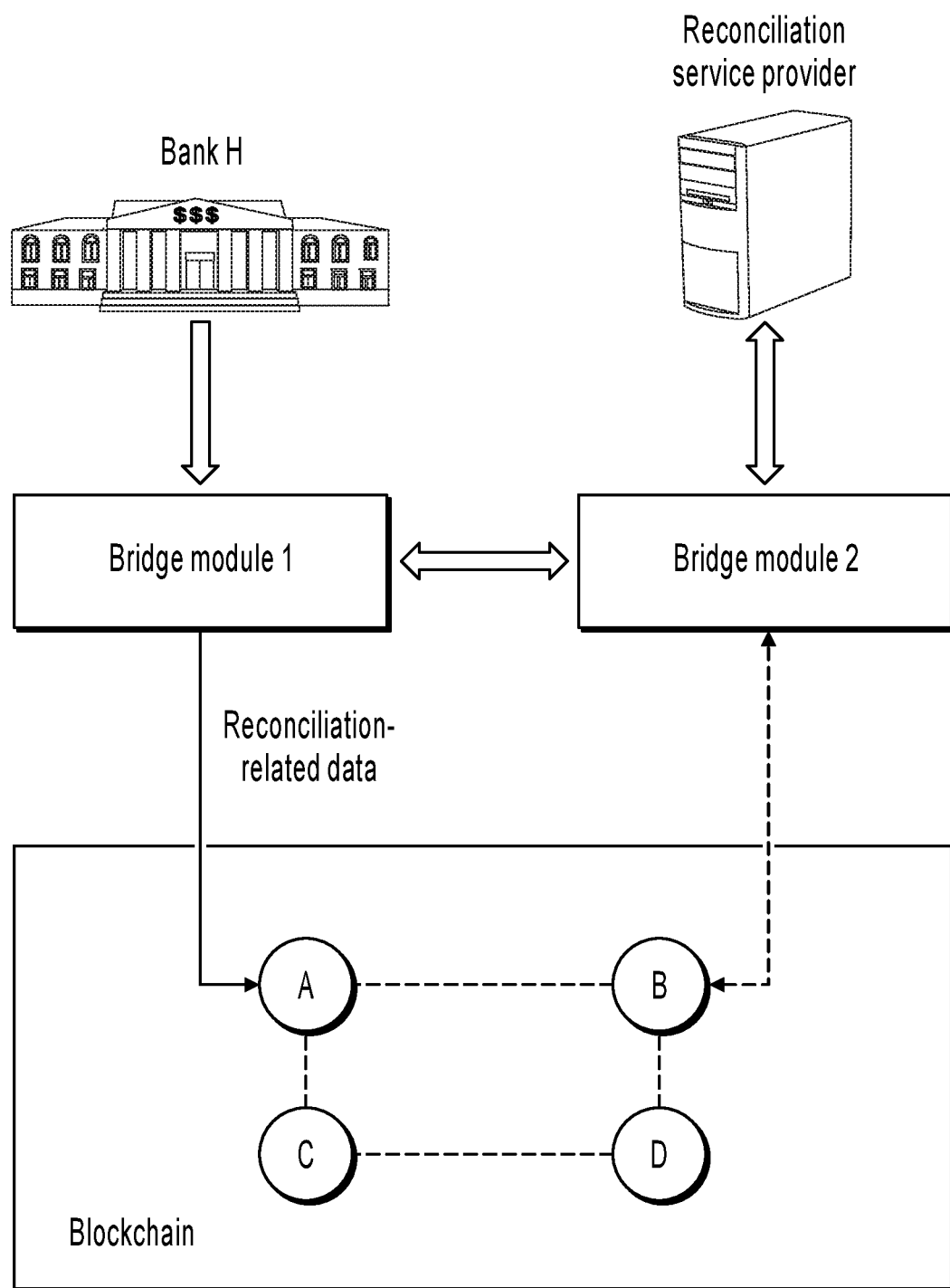
FIG. 5 is a schematic diagram illustrating entering reconciliation-related data into a blockchain, according to an example implementation.

FIG. 5 is a schematic diagram illustrating entering reconciliation-related data into a blockchain, according to an example implementation. As shown in FIG. 5, after completing the reconciliation operation, bank H can transmit the reconciliation-related data to blockchain node A by using bridge module 1, and blockchain node A triggers an operation of writing the reconciliation-related data, so that the reconciliation-related data can be written into the blockchain account book for subsequent query and supervision by regulatory authorities.

In an implementation, the reconciliation-related data can include any data related to the reconciliation operation performed by bank H, for example, the selection condition set by bank H, information about a change made by bank H to the off-chain transaction record. Implementations are not limited in the present specification.

Figure 6:
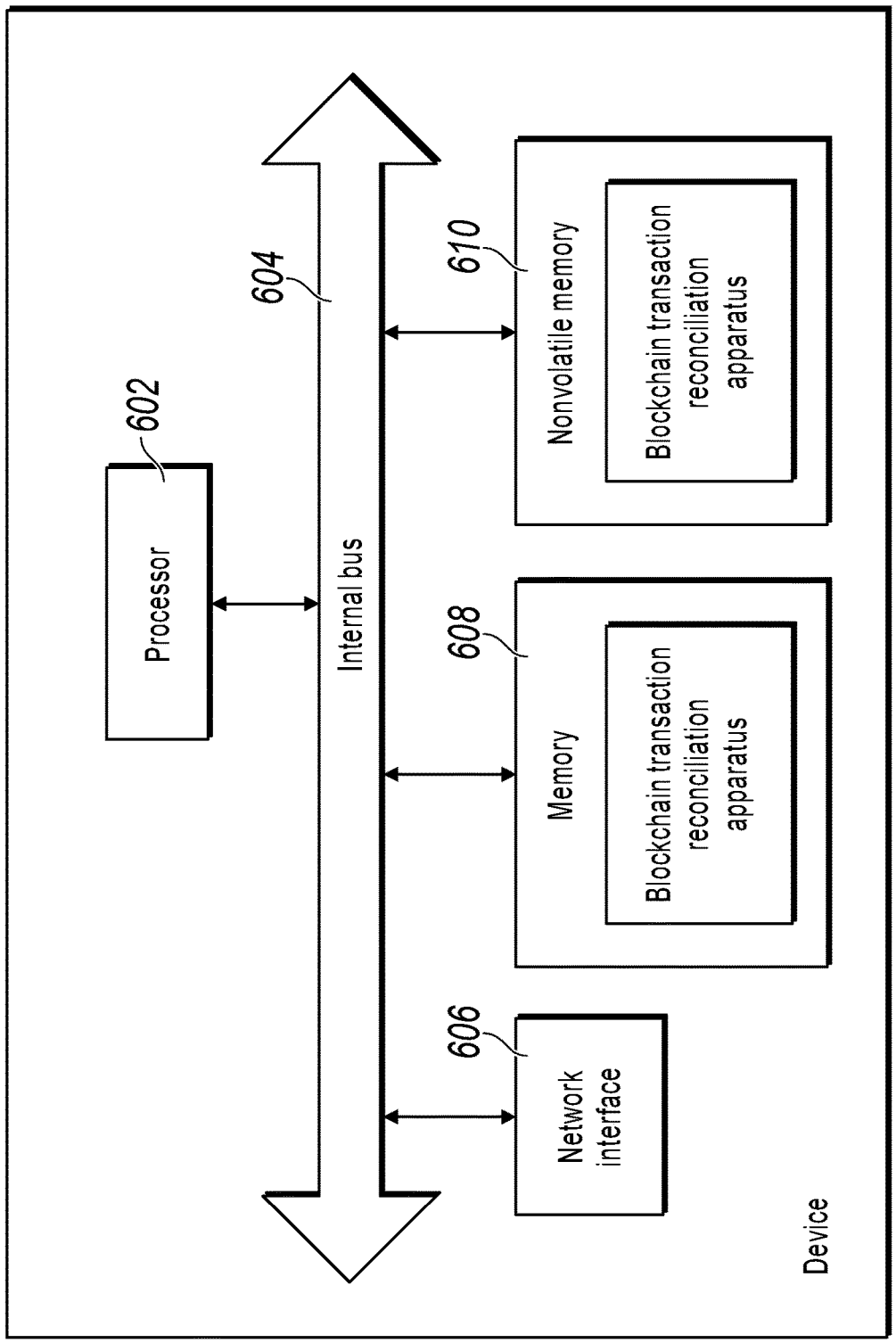
FIG. 6 is a schematic structural diagram illustrating a device, according to an example implementation.

FIG. 6 is a schematic structural diagram illustrating a device, according to an example implementation. Referring to FIG. 6, in terms of hardware, the device includes a processor 602, an internal bus 604, a network interface 606, a memory 608, and a nonvolatile memory 610, and certainly can further include the hardware needed by other services. The processor 602 reads a corresponding computer program from the nonvolatile memory 610 into the memory 608 and then runs the corresponding computer program, so as to logically form a blockchain transaction reconciliation apparatus. Certainly, in addition to software implementation, one or more implementations of the present specification do not exclude another implementation, for example, a logic device or a combination of hardware and software. That is, an executive body of the following processing procedure is not limited to each logic unit, and can also be hardware or a logic device.

Figure 7:
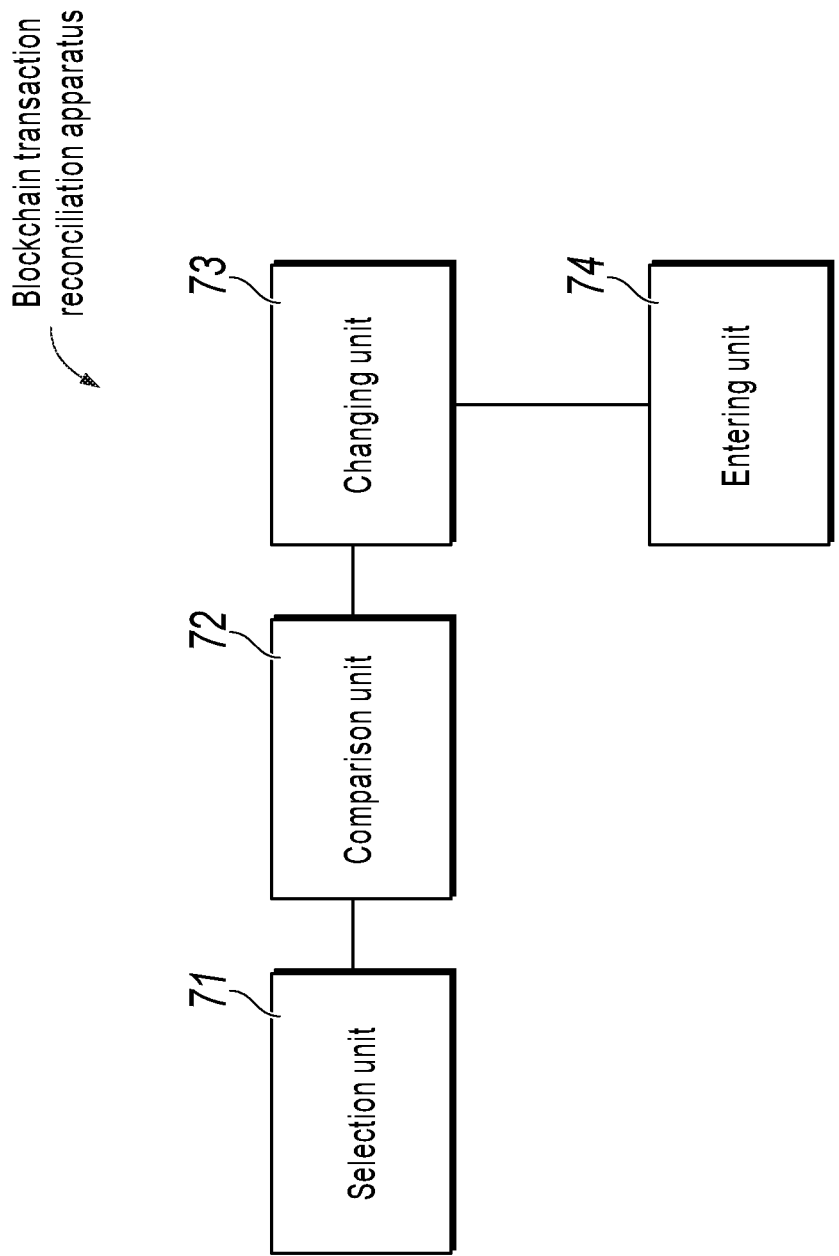
FIG. 7 is a block diagram illustrating a blockchain transaction reconciliation apparatus, according to an example implementation.

Referring to FIG. 7, in a software implementation, the blockchain transaction reconciliation apparatus can include: a selection unit 71, configured to enable a blockchain member to obtain a blockchain transaction record that is selected from a blockchain and satisfies a specified condition; a comparison unit 72, configured to enable the blockchain member to compare the blockchain transaction record with an off-chain transaction record maintained by the blockchain member; and a changing unit 73, configured to enable the blockchain member to change the off-chain transaction record based on the blockchain transaction record when the off-chain transaction record is inconsistent with the blockchain transaction record.

Optionally, the selection unit 71 is specifically configured to: enable the blockchain member to send the specified condition to a reconciliation service provider of the blockchain, and enable the blockchain member to receive the blockchain transaction record returned by the reconciliation service provider.

Optionally, the specified condition includes at least one of the following: a time period including a creation moment of the blockchain transaction record, a blockchain member participating in a blockchain transaction corresponding to the blockchain transaction record, and a condition that the blockchain transaction record is a normal transaction record or a refund transaction record.

Optionally, the comparison unit 72 is specifically configured to: enable the blockchain member to export the blockchain transaction record by using a bridge module configured between the blockchain member and the blockchain, to compare the blockchain transaction record with the off-chain transaction record of the chain The bridge module is separately connected to a first data interface provided by the blockchain member and a second data interface provided by the blockchain.

Optionally, the apparatus further includes: an entering unit 74, configured to enable the blockchain member to enter the specified condition and change information for the off-chain transaction record into the blockchain.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, an intelligent phone, a personal digital assistant, a media player, a navigation device, an email receiving and sending device, a game console, a tablet computer, a wearable device, or any combination of several devices in these devices.

In a typical configuration, the computer includes one or more processors (CPU), an input/output interface, a network interface, and a memory.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette tape, a magnetic disk storage, a quantum memory, a graphene-based storage medium or another magnetic storage device, or any other non-transmission medium. The computer storage medium can be used to store information that can be accessed by the computing device. Based on the definition in the present specification, the computer readable medium does not include transitory computer readable media (transitory media) such as a modulated data signal and carrier.

It is worthwhile to further note that the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific implementations of the present specification are described above. Other implementations fall within the scope of the appended claims. In some cases, the actions or steps described in the claims can be performed in an order different from that in the implementation and the desired results can still be achieved. In addition, the process described in the accompanying drawings does not necessarily require a particular execution order to achieve the desired results. In some implementations, multi-task processing and parallel processing can be performed or can be advantageous.

The terms used in one or more implementations of the present specification are merely for the purpose of describing specific implementations, and are not intended to limit the one or more implementations of the present specification. The terms "a" and "the" in a singular form used in the one or more implementations of the present specification and the appended claims are also intended to include a plural form, unless otherwise specified in the context clearly. It should be further understood that the term "and/or" used in the present specification indicates and includes any or all possible combinations of one or more associated listed items.

It should be understood that although terms "first", "second", "third", etc. can be used in one or more implementations of the present specification to describe various types of information, the information is not limited to the terms. These terms are only used to differentiate information of a same type. For example, without departing from the scope of the one or more implementations of the present specification, first information can also be referred to as second information, and similarly, the second information can be referred to as the first information. Depending on the context, for example, the word "if" used here can be explained as "while", "when", or "in response to determining".

The previous descriptions are only example implementations of one or more implementations of the present specification, but are not intended to limit the one or more implementations of the present specification. Any modification, equivalent replacement, improvement, etc. made without departing from the spirit and principle of the one or more implementations of the present specification shall fall within the protection scope of the one or more implementations of the present specification.

Figure 8:
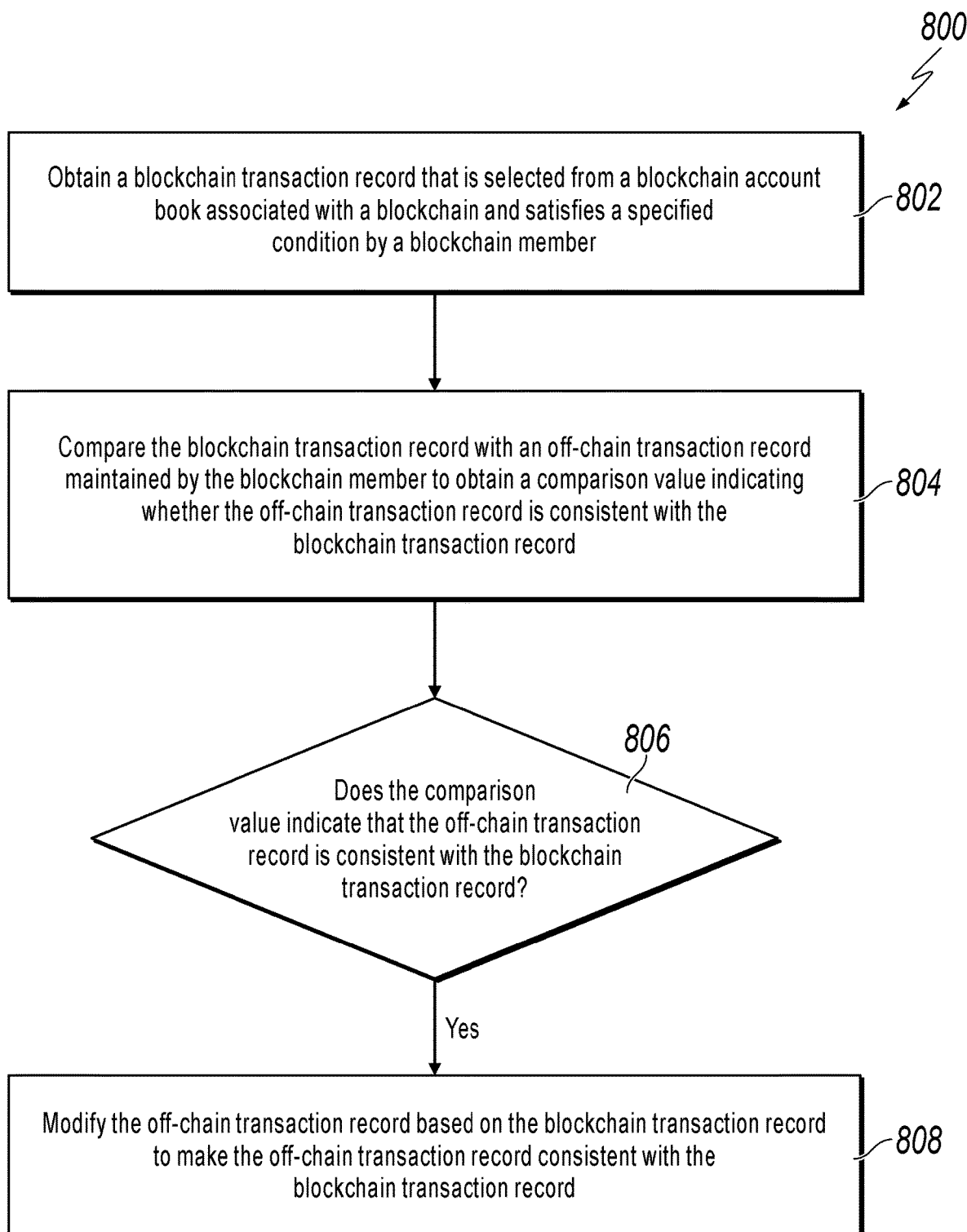
FIG. 8 is a flowchart illustrating an example of a computer-implemented method for blockchain transaction reconciliation, according to an implementation of the present disclosure.

FIG. 8 is a flowchart illustrating an example of a computer-implemented method 800 for blockchain transaction reconciliation, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, a blockchain transaction record that is selected from a blockchain account book associated with a blockchain and satisfies a specified condition is obtained by a blockchain member. In some implementations, the blockchain account book includes a plurality of blockchain transaction records that record information associated with asset transfer operations occurring on the blockchain. In some implementations, the blockchain includes a reconciliation service provider that provides a transaction record query service for the blockchain member.

In some implementations, obtaining the blockchain transaction record includes sending the specified condition to the reconciliation service provider of the blockchain to enable the reconciliation service provider to select a blockchain transaction record based on the specific condition; and receiving the blockchain transaction record returned by the reconciliation service provider.

In some implementations, the specified condition includes at least one of a moment at which the blockchain transaction record is created, a blockchain member that participates in a blockchain transaction corresponding to the blockchain transaction record, a condition indicating that the blockchain transaction record is a normal transaction record, or a condition indicating that the blockchain transaction is a refund transaction record. From 802, method 800 proceeds to 804.

At 804, the blockchain transaction record is compared with an off-chain transaction record maintained by the blockchain member to obtain a comparison value indicating whether the off-chain transaction record is consistent with the blockchain transaction record.

In some implementations, comparing the blockchain transaction record with the off-chain transaction record includes exporting the blockchain transaction record by using a bridge module that is configured between the blockchain member and the blockchain; and comparing the blockchain transaction record with the off-chain transaction record off the blockchain, where the bridge module is separately connected to a first data interface provided by the blockchain member and a second data interface provided by the blockchain. From 804, method 800 proceeds to 806.

At 806, a determination is made as to whether the comparison value indicates that the off-chain transaction record is consistent with the blockchain transaction record. If it is determined that the comparison value indicates that the off-chain transaction record is inconsistent with the blockchain transaction record, method 800 proceeds to 808.

At 808, the off-chain transaction record is modified based on the blockchain transaction record to make the off-chain transaction record consistent with the blockchain transaction record. In some implementations, method 800 further includes entering the specified condition and modified information for the off-chain transaction record into the blockchain. After 808, method 800 can stop.

Implementations of the present application can solve technical problems in data record reconciliation. When transaction operations are implemented based on the blockchain network, the transaction operations can be automatically implemented through a smart contract, and transaction records can be recorded in the blockchain account book without being tampered with, thereby eliminating mistrust between blockchain members and solving the problem of interconnection between off-chain management systems of different blockchain members.

Implementations of the present disclosures provide methods and apparatuses for data record conciliation in the blockchain. For example, the described method can be used for clearing documents that are generated for blockchain members based on all transaction flow records by the end of each day. Because content of the blockchain leger cannot be tampered with and is traceable, the transaction flow records maintained by the blockchain members can be checked and corrected according to the blockchain transaction records, improving, for example, data storage security, and, for example, reducing data storage space.

According to described implementations, the blockchain can include a reconciliation service provider, which can include one or more specific blockchain nodes on the blockchain and can be used to provide a transaction record query service for the blockchain member. For example, the blockchain member can send a specified condition to the reconciliation service provider by using a bridge module, so that the reconciliation service provider can select a blockchain transaction record based on the specified condition. Then the blockchain member receives the blockchain transaction record returned by the reconciliation service provider. Therefore, the blockchain member does not need to actively perform the selection operation. The reconciliation service provider can provide related services for all the blockchain members on the blockchain, and all the blockchain members can enjoy the services provided by the reconciliation service provider without separately performing the selection operation on the blockchain transaction record, so that the blockchain members can focus more on blockchain-based asset transactions.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for discovering and correcting missing or erroneous information in modifiable off-chain transaction records using unmodifiable blockchain transaction records, the method comprising:

obtaining, by a blockchain member, a blockchain transaction record that is selected from a blockchain ledger associated with a blockchain and satisfies a specified condition, wherein the blockchain member is associated with a corresponding blockchain node in the blockchain, wherein the blockchain ledger is maintained on the corresponding blockchain node in the blockchain, and wherein the blockchain transaction record includes first information describing a transaction, wherein the specified condition comprises at least one of a time duration at which the blockchain transaction record is created, a blockchain member that participates in a blockchain transaction corresponding to the blockchain transaction record, a condition indicating that the blockchain transaction record is a normal transaction record, or a condition indicatinq that the blockchain transaction is a refund transaction record;

comparing, by the blockchain member and after exporting the blockchain transaction record using a bridge module configured between a first data interface of the blockchain member and a second data interface of the blockchain, the blockchain transaction record with an off-chain transaction record maintained by the blockchain member, wherein the off-chain transaction record includes second information describing the transaction and is stored, by the blockchain member, separate from the blockchain and using different description fields than the first information;

determining, by the blockchain member and based on the comparing, that the second information of the off-chain transaction record is inconsistent with the first information of the blockchain transaction record based on the second information (i) being modified after the off-chain transaction record was created or (ii) including an incomplete description of the transaction relative to the blockchain transaction record;

in response to the determining that the second information of the off-chain transaction record is inconsistent with the first information of the blockchain transaction record, performing, by the blockchain member, a reconciliation operation on the off-chain transaction record based on the blockchain transaction record to make the second information of the off-chain transaction record consistent with the first information of the blockchain transaction record, the reconciliation operation including making at least one change to the second information of the off-chain transaction record; and recording, by the blockchain member, reconciliation-data into the blockchain ledger maintained in the blockchain, wherein the reconciliation-data comprises an identification of the blockchain member that performed the reconciliation operation, an indication that a change has been made to the off-chain transaction record, and an identification of the at least one change made by the blockchain member to the off-chain transaction record.

2. The computer-implemented method of claim 1, wherein the blockchain ledger includes a plurality of blockchain transaction records that record information associated with asset transfer operations occurring on the blockchain.

3. The computer-implemented method of claim 1, wherein the blockchain includes a reconciliation service provider that provides a transaction record query service for the blockchain member.

4. The computer-implemented method of claim 3, wherein obtaining the blockchain transaction record comprises:
   sending the specified condition to the reconciliation service provider of the blockchain; and
   receiving the blockchain transaction record returned by the reconciliation service provider.

5. The computer-implemented method of claim 1, wherein comparing the blockchain transaction record with the off-chain transaction record comprises:
   comparing the blockchain transaction record with the off-chain transaction record off the blockchain, wherein the bridge module is respectively connected to the first data interface provided by the blockchain member and the second data interface provided by the blockchain.

6. A non-transitory, computer-readable medium storing one or more instructions executable by a computer system to perform operations for discovering and correcting missing or erroneous information in modifiable off-chain transaction records using unmodifiable blockchain transaction records, the operations comprising:
   obtaining, by a blockchain member, a blockchain transaction record that is selected from a blockchain ledger associated with a blockchain and satisfies a specified condition, wherein the blockchain member is associated with a corresponding blockchain node in the blockchain, wherein the blockchain ledger is maintained on the corresponding blockchain node in the blockchain, and wherein the blockchain transaction record includes first information describing a transaction, wherein the specified condition comprises at least one of a time duration at which the blockchain transaction record is created, a blockchain member that participates in a blockchain transaction corresponding to the blockchain transaction record, a condition indicating that the blockchain transaction record is a normal transaction record, or a condition indicating that the blockchain transaction is a refund transaction record;
   comparing, by the blockchain member and after exporting the blockchain transaction record using a bridge module configured between a first data interface of the blockchain member and a second data interface of the blockchain, the blockchain transaction record with an off-chain transaction record maintained by the blockchain member, wherein the off-chain transaction record includes second information describing the transaction and is stored, by the blockchain member, separate from the blockchain and using different description fields than the first information;
   determining, by the blockchain member and based on the comparing, that the second information of the off-chain transaction record is inconsistent with the first information of the blockchain transaction record based on the second information (i) being modified after the off-chain transaction record was created or (ii) including an incomplete description of the transaction relative to the blockchain transaction record;
   in response to the determining that the second information of the off-chain transaction record is inconsistent with the first information of the blockchain transaction record,
   performing, by the blockchain member, a reconciliation operation on the off-chain transaction record based on the blockchain transaction record to make the second information of the off-chain transaction record consistent with the first information of the blockchain transaction record, the reconciliation operation including making at least one change to the second information of the off-chain transaction record; and
   recording, by the blockchain member, reconciliation-data into the blockchain ledger maintained in the blockchain, wherein the reconciliation-data comprises an identification of the blockchain member that performed the reconciliation operation, an indication that a change has been made to the off-chain transaction record, and an identification of the at least one change made by the blockchain member to the off-chain transaction record.

7. The non-transitory, computer-readable medium of claim 6, wherein the blockchain ledger includes a plurality of blockchain transaction records that record information associated with asset transfer operations occurring on the blockchain.

8. The non-transitory, computer-readable medium of claim 6, wherein the blockchain includes a reconciliation service provider that provides a transaction record query service for the blockchain member.

9. The non-transitory, computer-readable medium of claim 8, wherein obtaining the blockchain transaction record comprises:
   sending the specified condition to the reconciliation service provider of the blockchain; and
   receiving the blockchain transaction record returned by the reconciliation service provider.

10. The non-transitory, computer-readable medium of claim 6, wherein comparing the blockchain transaction record with the off-chain transaction record comprises:
    comparing the blockchain transaction record with the off-chain transaction record off the blockchain, wherein the bridge module is respectively connected to the first data interface provided by the blockchain member and the second data interface provided by the blockchain.

11. A computer-implemented system method for discovering and correcting missing or erroneous information in modifiable off-chain transaction records using unmodifiable blockchain transaction records, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
       obtaining, by a blockchain member, a blockchain transaction record that is selected from a blockchain ledger associated with a blockchain and satisfies a specified condition, wherein the blockchain member is associated with a corresponding blockchain node in the blockchain, wherein the blockchain ledger is maintained on the corresponding blockchain node in the blockchain, and wherein the blockchain transaction record includes first information describing a transaction, wherein the specified condition comprises at least one of a time duration at which the blockchain transaction record is created, a blockchain member that participates in a blockchain transaction corresponding to the blockchain transaction record, a condition indicatinq that the blockchain transaction record is a normal transaction record, or a condition indicating that the blockchain transaction is a refund transaction record;

comparing, by the blockchain member and after exporting the blockchain transaction record using a bridge module configured between a first data interface of the blockchain member and a second data interface of the blockchain, the blockchain transaction record with an off-chain transaction record maintained by the blockchain member, wherein the off-chain transaction record includes second information describing the transaction and is stored, by the blockchain member, separate from the blockchain and using different description fields than the first information;

determining, by the blockchain member and based on the comparing, that the second information of the off-chain transaction record is inconsistent with the first information of the blockchain transaction record based on the the second information (i) being modified after the off-chain transaction record was created or (ii) including an incomplete description of the transaction relative to the blockchain transaction record;

in response to the determining that the second information of the off-chain transaction record is inconsistent with the first information of the blockchain transaction record, performing, by the blockchain member, a reconciliation operation on the off-chain transaction record based on the blockchain transaction record to make the second information of the off-chain transaction record consistent with the first information of the blockchain transaction record, the reconciliation operation including making at least one change to the second information of the off-chain transaction record; and recording, by the blockchain member, reconciliation-data into the blockchain ledger maintained in the blockchain, wherein the reconciliation-data comprises an identification of the blockchain member that performed the reconciliation operation, an indication that a change has been made to the off-chain transaction record, and an identification of the at least one change made by the blockchain member to the off-chain transaction record.

12. The computer-implemented system of claim 11, wherein the blockchain ledger includes a plurality of blockchain transaction records that record information associated with asset transfer operations occurring on the blockchain.

13. The computer-implemented system of claim 11, wherein the blockchain includes a reconciliation service provider that provides a transaction record query service for the blockchain member.

14. The computer-implemented system of claim 13, wherein obtaining the blockchain transaction record comprises:

sending the specified condition to the reconciliation service provider of the blockchain; and receiving the blockchain transaction record returned by the reconciliation service provider.

15. The computer-implemented system of claim 11, wherein comparing the blockchain transaction record with the off-chain transaction record comprises:

comparing the blockchain transaction record with the off-chain transaction record off the blockchain, wherein the bridge module is respectively connected to the first data interface provided by the blockchain member and the second data interface provided by the blockchain.

\* \* \* \* \*

UNITED STATES PATENT AND TRADEMARK OFFICE
CERTIFICATE OF CORRECTION

PATENT NO. : 10,789,598 B2
APPLICATION NO. : 16/424750
DATED : September 29, 2020
INVENTOR(S) : Hu et al.

Page 1 of 1

It is certified that error appears in the above-identified patent and that said Letters Patent is hereby corrected as shown below:

In the Claims

Column 14/Line 24, In Claim 1, delete "indicatinq" and insert -- indicating --, therefor.

Column 17/Line 5, In Claim 11, delete "indicatinq" and insert -- indicating --, therefor.

Column 17/Line 24, In Claim 11, delete "the the" and insert -- the --, therefor.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*